(12) United States Patent
Grebennikov et al.

(10) Patent No.: US 8,732,472 B2
(45) Date of Patent: May 20, 2014

(54) SYSTEM AND METHOD FOR VERIFICATION OF DIGITAL CERTIFICATES

(71) Applicant: Kaspersky Lab ZAO, Moscow (RU)

(72) Inventors: Nikolay A Grebennikov, Moscow (RU); Alexey V Monastyrsky, Moscow (RU); Alexander A Gostev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/862,119

(22) Filed: Apr. 12, 2013

(65) Prior Publication Data

US 2014/0095866 A1   Apr. 3, 2014

(30) Foreign Application Priority Data

Sep. 28, 2012 (RU) ................................. 2012141468

(51) Int. Cl.
*H04L 29/06* (2006.01)
*H04L 9/00* (2006.01)

(52) U.S. Cl.
USPC ................ 713/175; 713/156; 726/10; 726/26

(58) Field of Classification Search
None
See application file for complete search history.

(56) References Cited

U.S. PATENT DOCUMENTS

| | | | |
|---|---|---|---|
| 5,214,702 A | 5/1993 | Fischer | |
| 6,230,266 B1 * | 5/2001 | Perlman et al. | 713/158 |
| 7,127,741 B2 * | 10/2006 | Bandini et al. | 726/14 |
| 7,305,558 B1 | 12/2007 | Miyazaki et al. | |
| 7,401,356 B2 * | 7/2008 | Bandini et al. | 726/14 |
| 7,444,509 B2 * | 10/2008 | Nadalin et al. | 713/156 |
| 7,571,315 B1 | 8/2009 | Smith | |
| 7,644,280 B2 * | 1/2010 | Carro | 713/176 |
| 7,657,751 B2 | 2/2010 | Miculi et al. | |
| 7,739,494 B1 | 6/2010 | McCorkendale et al. | |
| 7,739,504 B2 | 6/2010 | Futa et al. | |
| 7,890,763 B1 | 2/2011 | Law et al. | |
| 7,953,979 B2 * | 5/2011 | Borneman et al. | 713/175 |

(Continued)

FOREIGN PATENT DOCUMENTS

| | | | | |
|---|---|---|---|---|
| EP | 2 020 798 A2 * | 2/2009 | | H04L 29/06 |
| EP | 2 249 283 A1 | 11/2010 | | |
| WO | WO 03/049358 A1 | 6/2003 | | |

OTHER PUBLICATIONS

South African National Standard; Information Technology—Security Technique—Evaluation Criteria for IT Security; SABSF. Baker; Oct. 2010; 75 pages.

(Continued)

*Primary Examiner* — Christopher Revak
(74) *Attorney, Agent, or Firm* — Patterson Thuente Pedersen, P.A.

(57) ABSTRACT

Analysis of authenticity digital certificates includes. Initial information pertaining to digital certificates is collected from diverse information sources. For each of the digital certificates the initial information includes intrinsic parameter data from among contents of the digital certificate and extrinsic parameter data pertaining to the digital certificate and comprising static data not contained in the contents of the digital certificate. Selected parameter data is stored and analyzed to determine a measure of suspiciousness for each of the digital certificates. If necessary, circumstantial data based on actual usage of one or more of the digital certificates are collected. The initial data and supplemental data are compared against a set of decision criteria that define fraudulent activity, and a determination of authenticity of each of the digital certificates is made.

30 Claims, 9 Drawing Sheets

(56) References Cited

U.S. PATENT DOCUMENTS

| | | | |
|---|---|---|---|
| 8,239,677 B2 | 8/2012 | Cohon | |
| 8,375,213 B2* | 2/2013 | Borneman et al. | 713/175 |
| 8,407,464 B2* | 3/2013 | Salowey et al. | 713/156 |
| 8,429,734 B2* | 4/2013 | Agbabian et al. | 726/10 |
| 2006/0005244 A1* | 1/2006 | Garbow et al. | 726/24 |
| 2006/0075502 A1* | 4/2006 | Edwards | 726/24 |
| 2006/0236100 A1* | 10/2006 | Baskaran et al. | 713/165 |
| 2008/0148374 A1* | 6/2008 | Spaur et al. | 726/6 |
| 2008/0256625 A1* | 10/2008 | Baskaran et al. | 726/17 |
| 2008/0282081 A1* | 11/2008 | Patiejunas | 713/153 |
| 2009/0106550 A1* | 4/2009 | Mohamed | 713/156 |
| 2009/0106551 A1 | 4/2009 | Buren et al. | |
| 2009/0138967 A1* | 5/2009 | Faieta et al. | 726/22 |
| 2009/0144436 A1* | 6/2009 | Schneider | 709/229 |
| 2009/0210703 A1* | 8/2009 | Epstein et al. | 713/157 |
| 2010/0153713 A1 | 6/2010 | Klein | |
| 2012/0124369 A1* | 5/2012 | Amenedo et al. | 713/156 |
| 2013/0007445 A1* | 1/2013 | Brown et al. | 713/156 |
| 2013/0013918 A1* | 1/2013 | Brown et al. | 713/156 |
| 2013/0117558 A1* | 5/2013 | Metke et al. | 713/156 |

OTHER PUBLICATIONS

Requirements for IP Version 4 Routers; F. Baker, Jun. 1995; 173 pages.

Improving SSL Certificate Security; Apr. 1, 2011; Ben Laurie; 7 pages.

DNS Cache Poisoning: Definition and Prevention; Tom Olzak; Mar. 2006; 9 pages.

Stone-Gross et al., "VeriKey: A Dynamic Certificate Verification System for Public Key Exchanges" Detection of Intrusions and Malware, and Vulnerability Assessment, 2008. http://www.google.com/url?sa=t&rct=j&q=&esrc=s&frm=1&source=web&cd=2&cad=rja&ved=0CCwQFjAb&url=http%3A%2F%2Fweb.eecs.umich.edu%2F~rwcohn%2Fpapers%2Fdimva08_verikey.pdf&ei=6S1pUNn9DrLDyQHjnYHYCA&usg=AFQjCNFBx9nr07j1QVyF7hDzcJJqqkwvOQ&sig2=9DkKufUkOA1jl3J3ztvgWw.

Lambert, "Comprised Certificate Authorities: How to protect yourself", IT Security. Sep. 13, 2011 http://www.techrepublic.com/blog/security/compromised-certificate-authorities-how-to-protect-yourself/6521.

Willis, "Sovereign Keys for Certificate Verification". Nov. 23, 2011 http://lwn.net/Articles/468911/.

Housley et al., "Internet X.509 Public Key Infrastructure Certificate and CRL Profile", Network Working Group. Jan. 1999.

Baker, "Requirements for IP Version 4 Router", Network Working Group. Jun. 1995.

* cited by examiner

| IP Address of Destination | Subnet Mask | Next Router | Network Interface | Cost |
|---|---|---|---|---|
| 0.0.0.0 | 0.0.0.0 | 192.168.0.1 | 192.168.0.100 | 10 |
| 127.0.0.0 | 255.0.0.0 | 127.0.0.1 | 127.0.0.1 | 1 |
| 192.168.0.0 | 255.255.255.0 | 192.168.0.100 | 192.168.0.100 | 10 |
| 192.168.0.100 | 255.255.255.255 | 127.0.0.1 | 127.0.0.1 | 10 |
| 192.168.0.255 | 255.255.255.255 | 192.168.0.100 | 192.168.0.100 | 10 |
| IP Address of Required Website | Subnet Mask | x.x.x.x | x.x.x.x | 1 |

| Company Specified in Certificate | URL Address | Certificate's Serial Number | Certification Center | Company Owning the Certificate |
|---|---|---|---|---|
| Company1 | www.mysite.com | Certificate 1 | CC [Certification Center] [1] | Company 1 |
| Company1 | www.mysite.com | Certificate 2 | CC [Certification Center] [1] | Company 1 |
| Company1 | www.mysite.com | Certificate 3 | CC [Certification Center] [2] | Company1 |
| Company1 | www.mysite.com | Certificate X | CC [Certification Center][X] | Company X |

*FIG. 6*

SYSTEM AND METHOD FOR VERIFICATION OF DIGITAL CERTIFICATES

PRIOR APPLICATION

This Application claims the benefit of Russian Federation Patent Application No. 2012141468 filed Sep. 28, 2012, incorporated by reference herein.

FIELD OF THE INVENTION

The invention relates generally to information processing and communications technologies and, more particularly, to independent verification of digital certificates to counter man-in-the-middle-type attacks.

BACKGROUND OF THE INVENTION

More and more communications are currently effected through the Internet. Today, for most people, it is a trivial matter to send or receive an email, make a purchase in an online store, discuss upcoming or past events on social networks, or chat with friends who are thousands of miles away using Internet telephone means. Since the Internet contains a large amount of confidential data, the issue of authentication of the parties during Internet communication is becoming more and more important.

To solve such issues, as early as over twenty years ago, a concept was developed for authentication of the communicating parties and transfer of encoded data through a public communication channel using asymmetrical code systems. Authentication refers to the process of checking whether the party with which communication is being effected is the one it is purporting to be. This approach is still quite popular. One of the main elements of this approach is the use of a public key infrastructure with certification centers and public key certificates (for brevity, the term certificate is used). In general, a certification center, or certificate authority, issues a public key certificate to an interested party, to be used for further authentication of this interested party. In this case, for correct operation of the whole system, the certification center issuing the certificate must be trusted and practically impossible to compromise. In most cases, the level of trust is determined using known information on the subject, such as his reputation. Indeed, until recently, events related to compromising a large certification center with good reputation did not amount to a serious scale. However, since today's offenders work in organized groups to take unlawful actions on the Internet and have sufficient financial and technical resources, such incidents are happening more and more often. The compromised certification centers Comodo and DigiNotar can be cited as examples. This increased attention of offenders to the operation of certification centers is explained first by the fact that it can be viewed as a single point of failure, which, once hacked, can give unlimited access to its resources, allowing to issue new fake certificates signed by a trusted party. Second, detection of a compromised certification center using existing tools can take from a few days to several months, which is quite sufficient for the offenders. Third, after a successful attack, the capabilities of a hacked certification center can be used for subsequent "man-in-the-middle"-type attacks, intended to gain access to confidential end user data. Hacking, in particular, means using vulnerabilities in architecture, communication protocols and software with the purpose to gain unauthorized access.

As there are reasons to expect similar attacks in the future as well, companies working in the area of Internet communication security are trying to suggest methods preventing the use of certificates fraudulently obtained by "man-in-the-middle"-type attacks. In particular, Google Inc. proposes to gather statistics on certificates using software which would check all Internet sites automatically and/or using a preset schedule. Subsequently, the gathered statistics can be used to build reputation for the certificates of a given website.

U.S. Pat. No. 7,739,494 discusses the calculation of a trust index for a given certificate, taking into account the information on the certification center issuing the certificate, the geographical location of the certificate holder, the type of the network connection being used, etc. The obtained index determines the level of trust for the certificate in question. The patent also notes that it is possible to analyze the statistics of user requests and replies for the website in question—for example, the number of requests sent to the site, information on the certificates obtained from the site, etc. It should be also noted that the use of the above described technologies makes it practically impossible to accurately distinguish a certificate issued to the actual site owner from a certificate obtained by offenders through compromising a certification center.

Therefore, a system is needed which would guarantee correct authentication of the communicating parties using a public key certificate even in case of obstacles created by offenders. Obstacles in this context means pre-planned actions intended to cause an authentication error, such as: compromising a certification center, providing false statistical data, as well as various types of "man-in-the-middle" attacks. A "man-in-the-middle"-type attack, for the purposes of this description, means, in particular, infiltration of an offender in a communication channel in order to gain access to confidential data of a party and/or unauthorized modification of incoming or outgoing messages, as well as modification of the operation logic of at least one device required for bilateral communication.

SUMMARY OF THE INVENTION

One aspect of the invention is directed to a system for analyzing authenticity digital certificates. In the system, a computer system includes computing hardware and a plurality of operatively-coupled modules comprise instructions executable on the computing hardware.

An initial data collection module is configured to obtain, from a plurality of diverse information sources communicatively coupled to the computer system, initial information pertaining to digital certificates, wherein for each of the digital certificates the initial information includes intrinsic parameter data from among contents of the digital certificate, and extrinsic parameter data pertaining to the digital certificate and comprising static data not contained in the contents of the digital certificate.

A database is configured to store selected parameter data from among the intrinsic parameter data and the extrinsic parameter data. An abnormality detection module is configured to analyze the selected parameter data to determine a measure of suspiciousness for each of the digital certificates, and based on the measure of suspiciousness, determine a need for collection of supplemental data for further analysis of any of the digital certificates. A communication module is configured to collect circumstantial data in response to a determination by the abnormality detection module of a need for supplemental data for any of the digital certificates, the circumstantial data pertaining to that digital certificate, and based on actual usage of that digital certificate. A suspicious certificate detection module is configured to compare the initial data and supplemental data against a set of decision criteria, the set of decision criteria defining parameters and combinations of parameters associated with fraudulent activity. A decision module is configured to provide a determination of authenticity of each of the digital certificates based on an output the suspicious certificate detection module.

In another aspect of the invention, a method for analyzing authenticity digital certificates includes obtaining, from a plurality of diverse information sources within the computer network, initial information pertaining to digital certificates. For each of the digital certificates the initial information includes intrinsic parameter data from among contents of the digital certificate and extrinsic parameter data pertaining to the digital certificate and comprising static data not contained in the contents of the digital certificate.

The method further includes storing, in a data store, selected parameter data from among the intrinsic parameter data and the extrinsic parameter data; analyzing the selected parameter data to determine a measure of suspiciousness for each of the digital certificates; based on the measure of suspiciousness, determining a need for collection of supplemental data for further analysis of any of the digital certificates; in response to the determination of need for supplemental data for any of the digital certificates, collecting circumstantial data pertaining to that digital certificate, the circumstantial data being based on actual usage of that digital certificate; comparing the initial data and supplemental data against a set of decision criteria, the set of decision criteria defining parameters and combinations of parameters associated with fraudulent activity; and based on the comparing, providing a determination of authenticity of each of the digital certificates.

BRIEF DESCRIPTION OF THE DRAWINGS

The invention may be more completely understood in consideration of the following detailed description of various embodiments of the invention in connection with the accompanying drawings, in which:

FIG. 2 represents a fragment of a typical routing table.

FIG. 6 illustrates an example of information about certificates, as may be stored in a database according to an embodiment of the invention.

Figure 1:
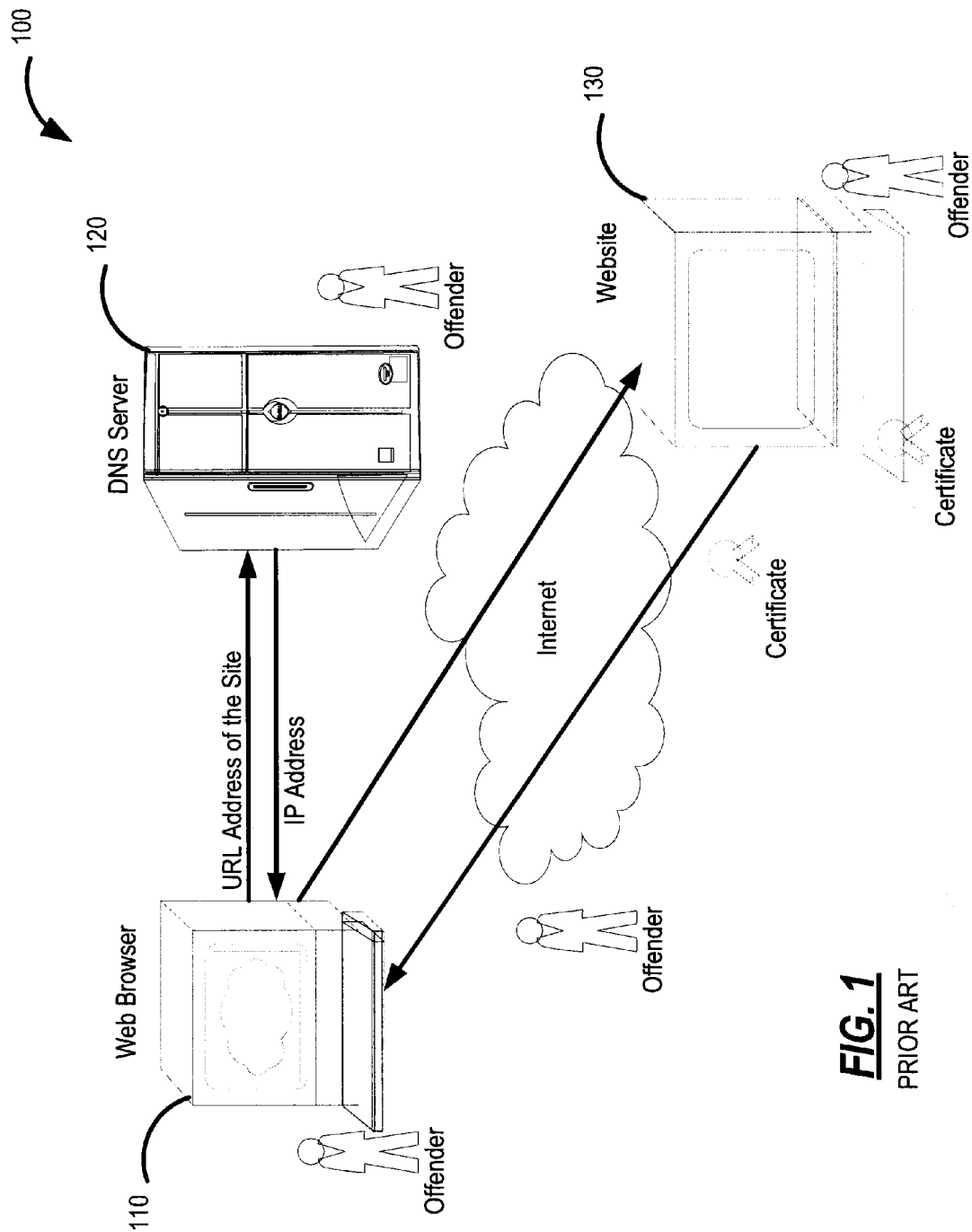
FIG. 1 represents a typical website authentication system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 represents an existing website authentication system. At the first stage, the user enters a uniform resource locator (URL) in the address line of the browser 110. Since communication in today's networks is performed using IP addresses, the web browser (in short, "the browser") first needs to determine the IP address for the requested website. To perform such actions, a domain name resolution service is used—a DNS server 120 with a domain name and IP address match table. The name resolution table can be partially located either locally on the user computer (for example, it can contain a match of URL and IP addresses for the most visited websites); or, if there is no local record, the domain name resolution request can be sent to a DNS server located remotely, for example, on a global or local network. Then, upon receipt of the IP address for the requested site, the browser can send a connection establishment request. For the purposes of this description, a URL address and a domain name can be considered synonyms.

In many cases, the communicating parties (the website and the user) are later required to perform an authentication procedure. Today's website authentication systems use public key certificates, which, on the one hand, allow to confirm the authenticity of the certificate holder, and, on the other hand, help to organize a secure data transfer through open communication channels. It should be noted that the request for the establishment of the connection and for further authentication is initiated by the browser on behalf of the user. It should also be taken into account that the connection establishment request is redirected from one router to another in accordance with preset routing rules.

Upon receipt of a connection establishment request, the website 130 sends back its public key certificate containing information on the holder of the certificate, for example, contact data, company name, URL address. The structure of the certificate is provided in the X.509 standard, described in Housley et al., Internet X.509 Public Key Infrastructure Certificate and CRL Profile, incorporated by reference herein. The certificate is routed in accordance with pre-defined global network routing rules. More details on the router operation technology are provided in Baker, Requirements for IP Version 4 Routers (RFC-1812), incorporated by reference herein.

Subsequently, the certificate is checked on the user's side, using conventional methods known in the art. For example, the verification of the certificate checks at least one of the following parameters: effective time period until expiration, correctness of the digital signature, presence or absence of recalled certificates in the lists, match between the domain name specified in the certificate and the URL address of the site in question, self-signature, etc. The X.509 standard and U.S. Pat. No. 7,739,494, the disclosure of which is incorporated by reference herein, explains some of the most common certificate verification technologies known today.

Figure 3:
FIG. 3 illustrates a part of a typical domain name resolution chart.

Since the above-described process of communication between the user and the website involves a large number of intermediaries, it is reasonable to assume that an offender can compromise any of the existing intermediaries. Therefore, in today's systems, one cannot be certain that the connection is being established with the requested website, or that the received certificate actually belongs to the company named in it. There can be several reasons for this, including the following:

- The offender made unauthorized changes to the routing table on the user's computer or on one of the routers, in order to direct all traffic through the offender's system. This approach is illustrated in more detail in FIG. 2. Therefore, the offender becomes able to read and modify the incoming and outgoing messages;
- The offender made unauthorized changes to the name resolution table; this means that, when the URL address of the requested website is specified in the browser, all traffic will be routed to an IP address specified in a local domain resolution table, which can in fact be hosted at the offender's IP address. Examples of domain name resolution charts are schematically illustrated in FIG. 3;
- The owner of website 130 is an offender. This means that the use of mechanisms (including the ones described above) redirected the user to a fake website where the offender offers the certificate, which could have been obtained unlawfully, for example, by compromising the certification center issuing the certificate.

Since the use of the existing mechanisms does not allow determination of the actual nature of the communication in case of active interferences by the offender, there is a need for a system and a method described below in this application.

FIG. 2 represents a fragment of the routing table 300, where an offender has made an unauthorized addition of a new route. Table 300 has several columns—the destination IP address, the subnet mask for the IP address, the IP address of the next router that must receive a network packet for subsequent processing, the network interface through which the communication occurs, and the cost of passage through the route.

The line where 0.0.0.0 is specified as the destination address is the default route, i.e., this address is used if there is no matching entry in the routing table 300. Therefore, the offender can use two opportunities: modify a default route by specifying his IP address as the next router, or add a new entry or change an old entry only for a specific website. The second option is shown in table 300, where x.x.x.x represents the offender's IP address.

FIG. 3 illustrates, in a simplified form, a part of the domain name resolution chart 400. This notes a match between the domain name and the IP address. For example, IP addresses for the google.com and facebook.com are specified. The changes made by the offender, in particular, in relation to the citibank.ru domain, are also noted. Therefore, if the name resolution chart 400 is used, all traffic intended for the www.citibank.ru website will be redirected to the offender's IP address. It should be noted that, at present, offenders actively use this opportunity, because some DNS servers use the technology of cashing data received from other DNS servers, one of which can be the offender's DNS server. More details on this kind of attacks are provided in the article DNS cache poisoning: definition and prevention by Tom Olzac, published in March 2006, incorporated by reference herein. Offenders can also make unauthorized changes to a local name resolution table on the user's computer, for example, in the hosts file. The information from this file has priority over access to DNS servers. For the purposes of this description, the examples of attacks shown in FIG. 2 and FIG. 3 will also be considered as "man-in-the-middle"-type attacks.

Figure 4:
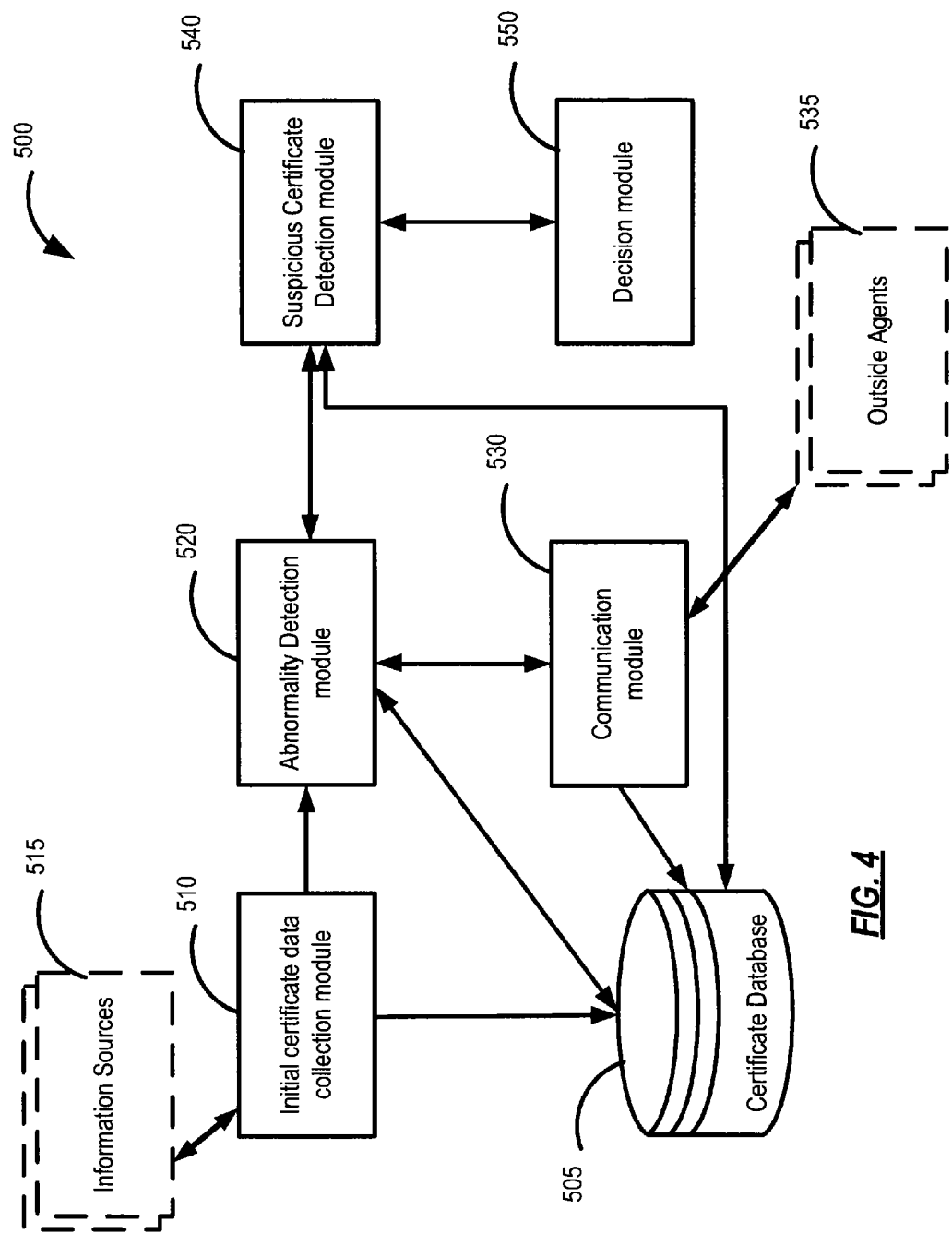
FIG. 4 is a diagram illustrating a certificate authentication system according to one embodiment of the present invention.
Figure 9:
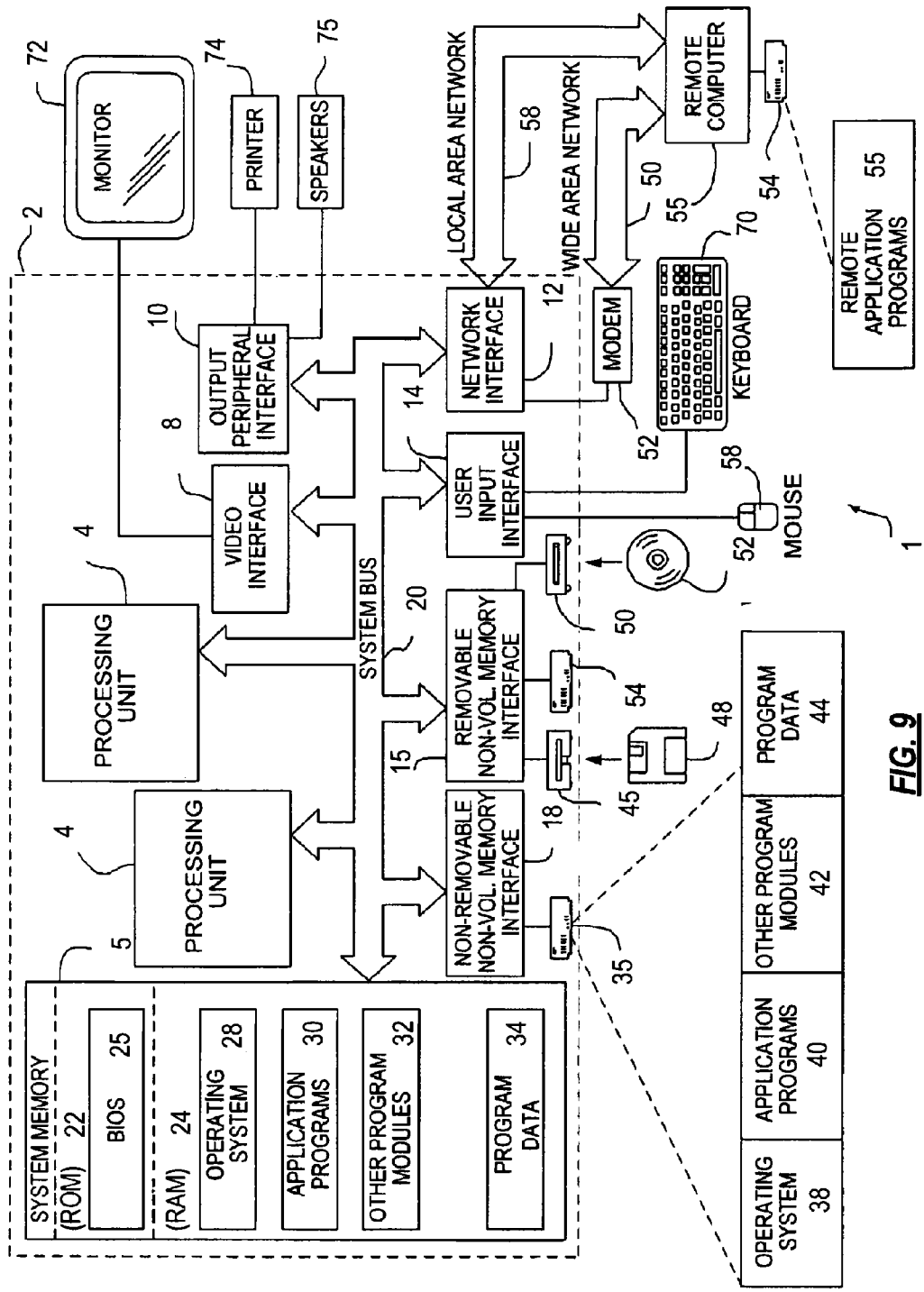
FIG. 9 is a diagram depicting an example of a general-purpose computer system in which aspects of the invention can be carried out.

FIG. 4 schematically illustrates a system 500 for verification of public key certificates in order to counter "man-in-the-middle"-type attacks according to one aspect of the invention. In individual embodiments, the system 500 can be implemented using one or multiple general-purpose computers, a sample diagram of which is shown in FIG. 9. One or several modules of the system 500 can also function on any computing device, including personal computers, servers, networking infrastructure devices (e.g., routers, firewalls), or mobile devices.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

The exemplary system depicted in FIG. 4 includes an initial certificate data collection module 510, operatively coupled with database 505 and with an abnormality detection module 520. Abnormality detection module 520 is operatively coupled with database 505, with a communication module 530, which receives supplemental information on the found certificates from outside agents 535, and with a suspicious certificate detection module 540, designed to identify certificates used by offenders for man-in-the-middle-type attacks. Module 540 is operatively coupled with database 505 and with a decision module 550, which, using data from the suspicious certificate detection module 540 builds final decisions for the certificate in question, taking into account the existing statistics.

Initially, the initial certificate data collection module 510 obtains information on the certificates that are encountered by sources of certificate information 515, and saves the information in database 505. In certain embodiments, the data on the issued certificates comes directly from certificate authorities issuing the certificates. In related embodiments, new certificates are received from websites that use the certificates in their operation. Information on new certificates is also gathered from users in certain embodiments. Any combination of these information sources can be used, such that information on certificates is obtained from a diverse set of sources. One advantage in the use of multiple sources of certificate information 515 is that attacks on some of the sources (bot not others) would produce anomalies that could be detected by the system.

In some embodiments, the certificates can be received from Internet service providers (ISPs), i.e., if an ISP finds a new certificate sent to one of their devices, they can report it to the initial certificate data collection module 510. Also, in addition, the company owning the certificate (according to the information accessible by the ISP) can be specified. The technology of communicating with an ISP according to one embodiment is depicted in more detail in FIG. 7.

In some embodiments, the initial certificate data collection module 510 polls the sources of information on the issued certificates with a preset frequency. The sources of data for the initial certificate data collection module 510, include entities that have gained access to the certificates during their operation, for example, certification centers, websites, users, Internet service providers, search engines (for example, from Google, Yahoo!, Yandex). Use of search engine data as a source of data can take into account such information as, for example, how long the certificate is known to the search engine and in what region the certificate was found. Subsequently, such information can be compared with the relevant data of known certificates from the website. In other embodiments of the initial certificate data collection module 510, data is received continuously from the sources themselves, as soon as new certificates appear.

The initial information on the certificates collected by initial certificate data collection module 510 can include parameter data intrinsic to each certificate, i.e., data that is included in the content of each certificate. In a related embodiment, the initial information on the certificates can include certain extrinsic parameter data pertaining to the certificate, though not necessarily expressly part of a given certificate's content. The extrinsic parameter data can include information as known by the information source, information about the information source itself, or about the receipt of the certificate parameter data from the information source. Examples of such extrinsic parameter data include the URL of the information source from which the certificate was obtained, location of the information source from which the initial information is obtained, the location of the Internet service provider of the certificate's owner, network-determined location of the presenter of the certificate, information on when the information source first encountered the certificate, and other static items of information closely associated with the certificate at the information source(s). Different information sources may provide information for different extrinsic parameters, depending on the extent to which each information source collects such extra data, and supports the sharing of such data. The initial information according to this type of embodiment is static in nature, meaning these parameters, whether intrinsic or extrinsic, do not change over time.

In one embodiment, the gathered certificates in the database are grouped by one or more parameters, such as the certificate's unique serial number, the name of the certificate's owner (e.g., company or website URL), similar names purporting to be from the certificate's owner (e.g., google.com would be grouped with gOOgle.com). In a related embodiment, certificates can be grouped by a combination of attributes, such as according to the certificate owner and the geographical distribution of certificates from that owner, or according to the owner and contact information associated with the owner.

The gathered information on the issued certificates is sent to the input of the abnormality detection module 520. At this stage, there is an analysis of the static data (intrinsic and extrinsic) for existing and new certificates stored in the database 505 to determine a measure of suspiciousness for any of the certificates. An example of records stored in the database 505 is depicted in FIG. 6.

To analyze the certificate parameters in order to determine the measure of suspiciousness in the newly issued certificates, various approaches can be used. For example, if the received certificate is known (being exactly the same as a known reference certificate, including the unique serial number), then the certificate can be deemed trustworthy. If the received certificate does not match a known reference certificate (e.g., having a different serial number), then the system determines if the received certificate falls into any of the groups. Based on a comparison of the parameters of the certificate against those of the group (or multiple groups) to which that certificate is assignable, a determination of trustworthiness can be made. Thus, for example, if a certificate in question purporting to be owned by company A was reported by an information source located in southeast Asia, while a majority of previously-issued certificates corresponding to company A were reported by information sources located in western Europe, then the certificate can be deemed suspicious.

In a related embodiment, time-based analysis of dates specified in the certificate and in previously-collected certificate is performed, including comparing different date fields. For example, if a newly certificate appears in the database grouped by URL address, and if more than a predefined time period (e.g., 6 months) is left before the expiry of a previous certificate for that URL address, then the new certificate is considered suspicious. In this example, the static item of information from the new certificate is not merely the intrinsic issue date that may be specified in the certificate; rather, it is the date on which the information source received the certificate, which is an extrinsic item of information.

For example, the following events are considered suspicious:
Occurrence of a new certificate for a known company or a known URL address;
Modification of the certification center and/or Internet service provider for a known company or URL address;
Differences in contact data and/or geographical location between older and newer certificates of a known company or URL address, etc.

Also, detection of suspicious certificates can be done using a trained neural network, whose inputs represent key data on the certificate, such as the effective period, certification center, URL address, owner's name and contacts, Internet service provider used by the owner, and so on. It should be noted that this stage performs only a preliminary determination of suspicious certificates, which are stored in a list or other suitable data structure. Further inquiry is needed to make a final determination as to the authenticity of the certificates.

According to various embodiments, the measure of suspiciousness can be represented in different ways. For instance, the measure of suspiciousness can be a numeric value (e.g., between 1 and 100), or a categorization (e.g., untrustworthy/suspicious/trustworthy).

In a related embodiment, for certain ones of the certificates from the preliminary list of suspicious certificates, supplemental information is obtained from outside agents 535 using communication module 530. The supplemental information includes circumstantial information that relates to actual usage events corresponding to the digital certificate in question.

This action is performed in response to a decision as to whether or not to obtain such supplemental information. Various considerations can be taken into account according to certain embodiments. For example, the decision to collect the supplemental information can be based on:
The required level of protection; e.g., if a high level of protection is required for all new certificates (for example, if all the parameters are the same as a known certificate except the serial number) then supplemental circumstantial information should be requested. If a lower level of protection is specified, then the decision will depend on additional factors.
A non-match in certificate parameters between the digital certificate in question, and one or more reference certificates; e.g., assuming a certificate for a website gOOgle.com was received, the certificate could be grouped into a group associated with Google, but because it does not match the name of the website (using a straight-forward textual comparison), then supplemental information would be needed. There may also be some logic that determines which parameters can remain be non-matched, without triggering the requirement to obtain the supplemental information;

A non-match between certain parameters of the certificate in question and the assigned group; for instance, in the group associated with Google Inc. The website gmail.com may already have several certificates. Key parameters (e.g., date, the certification center, etc.) of existing and new certificates are compared for the group. Anomalies between the certificate in question, and major trends for the group can be causes for further research;

Statistics associated with the owner (for example, how often have false certificates been identified in the assigned group, subgroup, group category, etc.);

Statistics-based reputation of the issuing certificate authority.

To obtain the supplemental circumstantial information, communication module 530 communicates with outside agents in order to receive the supplemental information, for example, on the company who actually owns the certificate, as well as on the certificate's effective period. In the present context, the term outside agents means the same source of data determined for the initial certificate data collection module 510, but it should be noted that, in this case, circumstantial information on the certificate and its owner is gathered; for example, how long the certificate has been used, what company is the actual owner of the certificate, and so on. The information can also be requested from an additional source, i.e., if information on the issued certificate is received from a certification center using the initial certificate data collection module 510, the communication module 530 can poll other sources, for example, Internet service providers, users and search engines.

It should be mentioned that supplemental information is gathered only for the certificates that were marked by the abnormality detection module 520, and on which there is not enough information to make a final decision. The division of the verification process into two stages is explained primarily by the increased efficiency of the system in general, because most new certificates will not require additional check.

Then the suspicious certificate detection module 540 analyzes the certificates received from the abnormality detection module 520, for which supplemental information was gathered using the communication module 530. In the general case, in order to identify suspicious certificates, the information received from the certificate itself is compared with the information received from outside agents. For example, the certificate specifies company x as the owner, but, according to the data received from outside agents, company K is the owner; i.e., there is a discrepancy which may be caused by a "man-in-the-middle"-type attack. The following can be used as parameters for the analysis at this stage: data on the certificate's owner, information on the Internet service provider, information on the certificate's effective period, data from users, and so on. More details on the suspicious certificate detection mechanism are provided in the description for FIG. 8.

Upon detection of suspicious certificates using the suspicious certificate detection module 540 by comparing information from the certificate and from outside sources, the received data are assessed using the decision module 550. The decision on the authenticity of a certificate can be made using any known methodologies, for example, using accumulated statistics reflecting information on the probability of a "man-in-the-middle"-type attack. For example, it is known that, if the name of the company actually owning the certificate does not match the information in the certificate, then the probability of a "man-in-the-middle"-type attack equals 1. Such information can be stored in the form of a list or a "key parameter—probability of attack" table, where a key parameter means an intrinsic or extrinsic parameter of the certificate, which is associated with an owner of the certificate, and for which parameter a discrepancy has been identified.

It should be noted that the probability value in this list can vary depending on the received feedback. This means that, if, with time, it is found that a modification of a certification center in most cases is not a result of a "man-in-the-middle"-type attack, then the probability of an attack in case of change of this key parameter can be lowered. If there are several key parameters for which a discrepancy was found, the probability of an attack for the certificate being analyzed is calculated as a function that depends on the probability of an attack for all modified parameters—for example, it can be the maximum probability of an attack for all modified parameters. In other embodiments, the calculation of the probability of an attack can use weight indexes, depending on the number and/or combination of the certificate's key parameters for which a discrepancy was found. It is decided that the certificate should not be used if the probability of an attack for the certificate exceeds the preset threshold value.

The decisions can be saved in a database for the purpose of gathering statistics. In some embodiments, the specified statistics are used to build reputation for certification centers. This means that, if the number of certificates declared to be falsified exceeded the threshold value for the certification center within the preset time period, this is a reason to believe that the certification center in question could have been compromised. The reputation of the certification center can also be taken into account in making a decision on the legitimacy of the certificate's use. In other embodiments of this invention, the statistics are intended to identify companies and URL addressed which are most often targeted by "man-in-the-middle"-type attacks. Such information can be used when making a decision on the legitimacy of the use of a certificate for the company and/or URL address in question. Therefore, if it is found that a company is often targeted by attacks involving falsified certificates, a weight index can be additionally introduced, which depends on the number of attacks and increases the probability of the use of a suspicious certificate in a "man-in-the-middle"-type attack.

Figure 5:
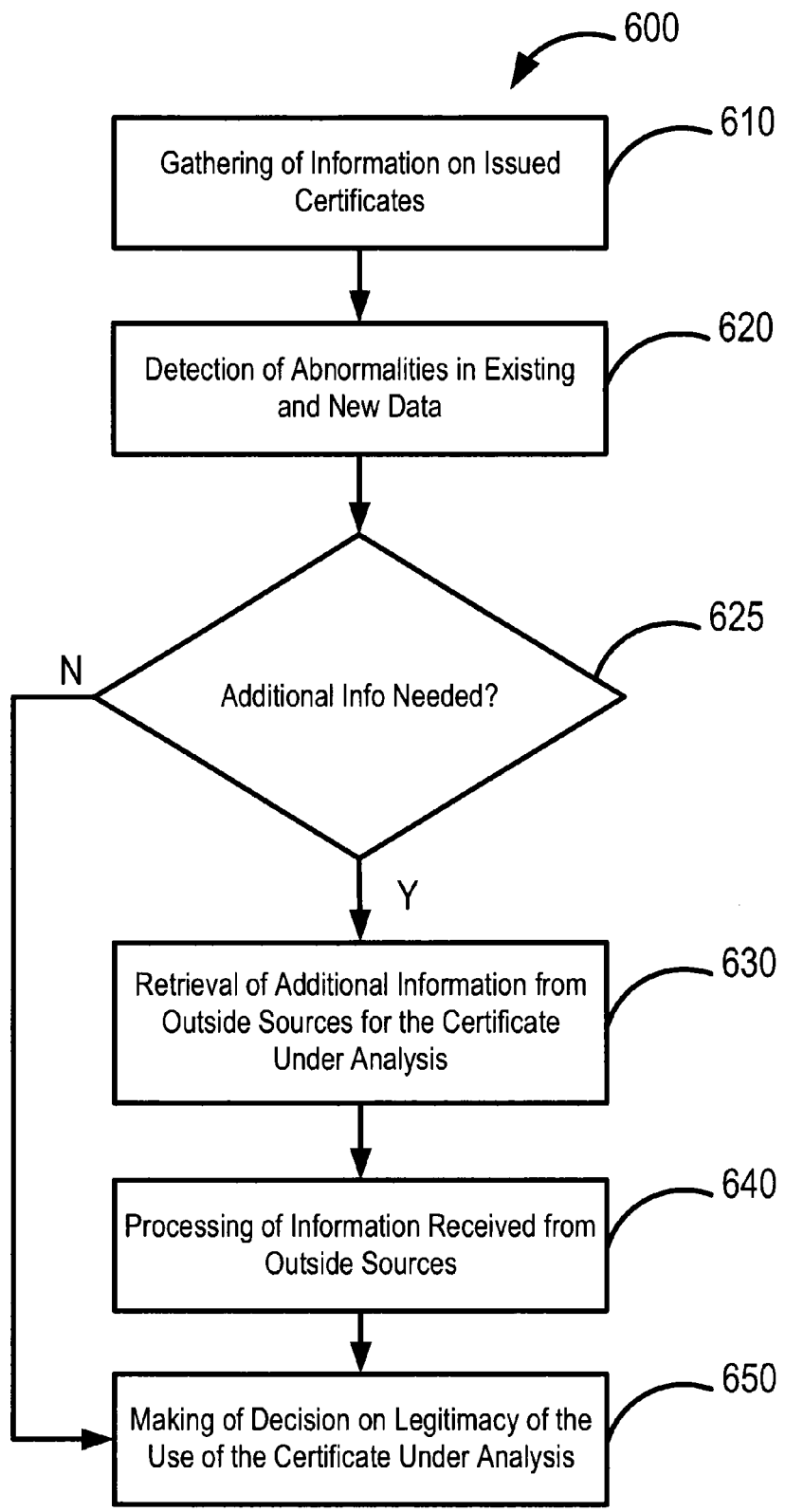
FIG. 5 is a flow diagram illustrating an exemplary authentication process according to one embodiment of the invention.

FIG. 5 illustrates a public key certificate verification process 600, that in one embodiment can be realized using system 500. In one embodiment, process 600 is executed on one or more servers, such as in a cloud computing model.

In a related embodiment, process 600 is initiated by a security application that is running on a client's PC which is operatively coupled to the one or more servers of the cloud. For example, the cloud service can be provided by a provider of security services from whom the security application of the client's PC was obtained. Process 600 can be initiated in response to a detected need on the client's PC to check the authenticity of a digital certificate which is encountered. The certificate can be encountered, for example, as part of a user's Web browsing activity. In one embodiment, the detection is accomplished by a specialized monitoring process, such as by a browser plugin associated with the security application. In another embodiment, a separate monitoring service—separate from the Web browser application—is tasked with monitoring communications on the client side and is configured to detect digital certificates being presented in the communication protocol. Thus, the monitor can be implemented as part of a firewall.

In another embodiment, process 600 is initiated by one or more of information sources 515. According to this approach, each information source 515 tracks certificates that it encounters. Whenever an information source 515 encounters a new certificate, i.e., not previously encountered, it informs system 500, which then initiates process 600. According to this model, the certificate authentication service can process the certificates in advance (by performing process 600), before a request from the client is received. In this case, the result of process 600, i.e., the decision on the legitimacy of the certificate under analysis, is stored for later retrieval. When a request is received to check the authenticity of a certificate from the client, the legitimacy of the stored certificate legitimacy is retrieved, and a result based thereupon is returned to the client.

In a variation of this embodiment, process 600 is initiated sua sponte on the server-side, e.g., in response to a passage of time or in response to some event. Information on new certificates can be gathered from information sources 515 by polling, for example.

In a related embodiment, all of the approaches can be used. Thus, for example, process 600 can be initiated by either, the client request, by the information sources, sua sponte by a server process, by any two of these approaches, or by all three of the approaches.

In process 600, the first operation 610 gathers information on the issued certificates using the initial certificate data collection module 510. The following examples can be used as sources of information 515 on the issued certificates: certification centers, websites, users, Internet service providers and search engines.

For example, an Internet service provider can notify the initial certificate data collection module 510 upon detection of a new certificate received by one of the devices, and additionally specify the company owning that certificate, based on the information available to the ISP. One example of a technology facilitating communication with the Internet service provider is described below in more detail in connection with FIG. 7.

Work with search engines as the information sources 515 can take into account information, for example, on how long the certificate is known to the search system, and in what region the certificate was found. Later, such information can be compared with the relevant data for the already known certificates of the website in question.

In a related embodiment, the analysis of the region can take into account the statistics of distribution of certificates by regions; for example, a change in the nature of the statistical distribution of certificates can be classified as a suspicious event. This means that, if the known certificates of a company are equally distributed over all large geographical regions (for example, one in Europe, America, Africa and Asia), and a newly-issued certificate changes the nature of the distribution (for example, a second certificate appears for Asia), this is a reason to believe that the type of statistical distribution has changed, and, consequently, the event is suspicious.

Abnormalities in existing and new data are detected at 620 using the abnormality detection module 520. This operation analyzes the certificates stored in the database 505. An example of records stored in the database 505 is depicted in FIG. 6. To analyze abnormalities in the newly issues certificates, various approaches can be used, which are known from the art; for example, it is possible to use preset rules for identifying suspicious certificates of the following type: "if a new certificate appears in the database for the existing URL address, and if there is more than six months left before the expiry of the existing certificate, then the new certificate is considered suspicious". For example, the following events are considered suspicious:

Occurrence of a new certificate for a known company or a known URL address;

Modification of the certification center and/or Internet service provider for a known company or URL address;

Differences in contact data and/or geographical location between older and newer certificates of a known company or URL address, etc.

Also, detection of suspicious certificates can be done using a trained neural network, whose inputs represent key data on the certificate, such as the effective period, certification center, URL address, owner's name and contacts, Internet service provider used by the owner, and so on. It should be noted that this operation performs only a preliminary determination of the list of certificates that need additional checks at further stages.

Upon creation of a preliminary list of suspicious certificates, operation 630 is performed, which involves receiving information from outside agents using the communication module 530. This action may or may not be needed depending on the result of the determination of suspiciousness of the certificate. For example, if the certificate is highly suspicious, then it may be immediately deemed untrustworthy, and operation 630 would therefore be unnecessary. Likewise, if the initial review of the certificate indicates that the certificate is likely to be legitimate, then further research may not be necessary.

On the other hand, if there are indicators of suspiciousness, though not to a high enough degree to immediately deem the certificate untrustworthy, then further research is called for. Thus, in response to a need to gather supplemental information, operation 630 communicates with outside agents in order to receive such supplemental circumstantial information. In one embodiment, the outside agents can be the same source of data determined at operation 610. In another embodiment, one or more different outside agents may be used.

In any event, the supplemental circumstantial information includes more comprehensive information on the usage of the certificate and on its true owner. For example, circumstantial information can include how long the certificate has been used, geographic region information on actual usage (e.g., statistically aggregated), rates of usage of the certificate over time, and the like. Other circumstantial information about the owner can include a researched determination of the company is the actual owner of the certificate.

The supplemental circumstantial information can also be requested from one or more additional sources, i.e., if information on the issued certificate is received from a certification center at operation 610, then operation 630 can poll other sources, for example, Internet service providers, users, search engines, or any combination thereof.

In one embodiment, as discussed above, supplemental information is gathered only for the certificates that were highlighted at operation 620, and for which there is not enough information to make a final decision. This is depicted at decision 625. The division of the verification process into two stages provides increased efficiency of the system in general, because in many cases new certificates will not require additional research.

Operation 640 processes the information received at 630 from outside sources for the certificates selected at 620, and produces a result that identifies suspicious certificates that may be used by the offender. In the general case, for this purpose, the information received from the certificate itself is compared with the information received from outside agents. For example, the certificate names company X as the owner, but, according to the data received from outside agents, company K is the owner; Thus, there is a discrepancy which may be caused by a "man-in-the-middle"-type attack. The following can be used as parameters for the analysis at this stage: data on the certificate's owner; data on the Internet service provider for the certificate's owner; information on the certificate's effective period; data from users; and so on. More details on an example of a suspicious certificate detection process are provided below in connection with FIG. 8.

Upon detection of suspicious certificates at operation 650, a decision is made on the legitimacy of the use of the certificate being analyzed. This operation is performed using the decision module 550. The decision on the authenticity of a certificate can be made using any known methodologies, for example, using accumulated statistics reflecting information on the probability of a "man-in-the-middle"-type attack. For example, it is known that, if the name of the company actually owning the certificate does not match the information in the certificate, then the probability of a "man-in-the-middle"-type attack equals 1. Such information can be stored in the form of a list or a "key parameter—probability of attack" table, where a key parameter means an intrinsic or extrinsic-parameter of the certificate, which is associated with an owner of the certificate, and for which parameter a discrepancy has been identified.

It should be noted that the probability value in this list can vary depending on the received feedback. This means that, if, with time, it is found that a modification of a certification center in most cases is not a result of a "man-in-the-middle"-type attack, then the probability of an attack in case of change of this key parameter can be lowered. In some embodiments, if there are several key parameters for which a discrepancy was found, the probability of an attack for the certificate being analyzed is calculated as the maximum probability of attack for all modified parameters. It is decided that a certificate is being used unlawfully if the probability of attack for the certificate exceeds the preset threshold value.

Decisions can be saved in a database for the purpose of gathering statistics. In some embodiments, the specified statistics are used to build reputation for certification centers. This means that if the number of certificates declared to be fake exceeded the threshold value for the certification center within the preset time period, this is a reason to believe that the certification center in question could have been compromised. The reputation of the certification center can also be taken into account in making a decision on the legitimacy of the certificate's use. In other embodiments of this invention, the statistics are intended to identify companies and URL addressed which are most often targeted by "man-in-the-middle"-type attacks. Such information can be used when making a decision on the legitimacy of the use of a certificate for the company and/or URL address in question.

It should be noted that, in some embodiments of the invention, the system 500 and the method 600 operate on the Internet service provider's hardware. This provides an opportunity to check the traffic coming from the ISP's clients for known certificates. If such certificates are found, the information in the certificate is compared with the data on the client in the ISP's internal databases, and the further decision can be made based on a match or no match between the certificate's key parameters and additional circumstantial data. As it was described above, the supplemental circumstantial information on a certificate and its holder can be also received from other outside agents. In some embodiments of this invention, when the above-described approach is used, if it is decided that the certificate in question is being used unlawfully, the outgoing traffic is blocked, which prevents authentication errors on the user's side.

FIG. 6 illustrates an example of a table data structure representing gathered certificates, as might be stored in the database 505. In one embodiment, the database 505 contains information received both from the certificate itself and from outside sources. For instance, as shown in FIG. 6, the table includes the following fields: the company named in the certificate (the owner); the URL address specified in the certificate; the certificate's serial number; the certification center which issued the certificate; the company actually owning the certificate. The major difference between the first and the last fields is that, in the first case, the information on the owner was received from the certificate itself, while in the second case, it was received from outside agents. In other embodiments, additional fields can be introduced, corresponding to other key parameters of the certificate, as well as the relevant data received from outside agents.

For example, a field can be added that would include information on the actual URL address for the certificate (the URL address from which the certificate was received).

Figure 7:
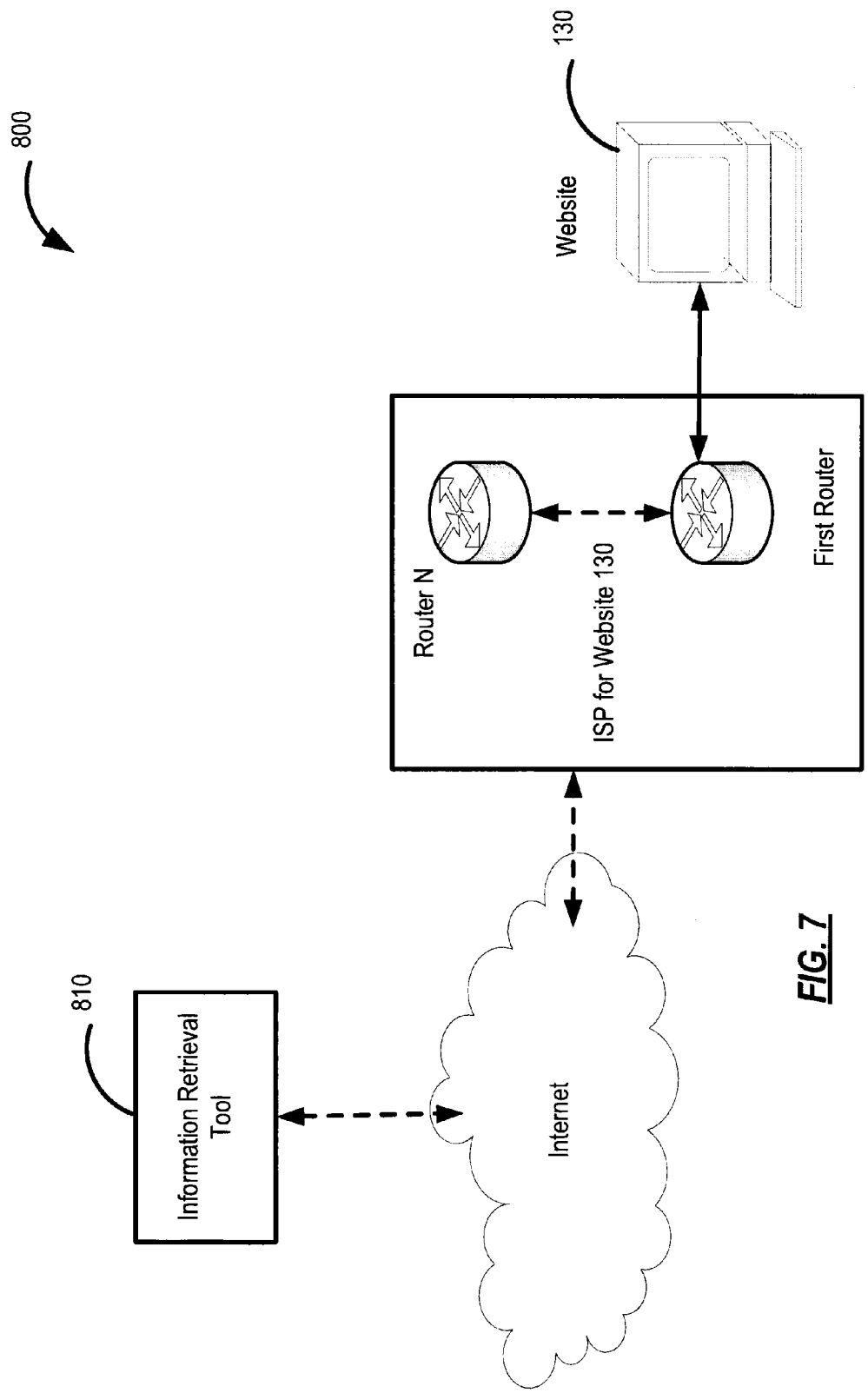
FIG. 7 illustrates an exemplary arrangement facilitating communication with Internet service providers according to one embodiment.

FIG. 7 illustrates an exemplary embodiment facilitating communication with Internet service providers. This communication involves the following parties: the information retrieval tool 810, connected by the Internet with the ISP 820, who has information on the website 130 on the certificate used by this website. It should be noted that either initial certificate data collection module 510 or communication module 530 can be chosen as information retrieval tool 810, without restricting the similarity. Communication between information retrieval tool 810 and provider 820 can be initiated by either information retrieval tool 810 or Internet service provider 820. In the communication, Internet service provider 820 sends data on known certificates to tool 810.

The Internet service provider 820 knows the main information on his clients—for example, the company name. Also, in some embodiments, the ISP 820 can request the public key certificate used on the side of the website 130. Also, on the ISP's side, it is possible to check the match between the actual holder of the certificate and the company named in the certificate. In one embodiment, on the ISP side, if a company has received a certificate from a certificate authority, it must register the new certificate with the ISP. The ISP itself can then determine whether the certificate is legitimate (e.g., by looking up the certificate holder's name as it appears in the certificate, and comparing that name against the name associated with the client account at the ISP). Next, the ISP can scan network traffic for the presence of the certificate and either authorize or prohibit its use. If the certificate is authentic, the ISP can also put its signature on the certificate.

In another embodiment, the ISP registers each new certificate in a database of client certificates and associates it with the owner of the IP address. Registration of the certificate may be accomplished on a voluntary basis by the certificate holder, or the ISP can scan network traffic for the presence of a specific file format (which indicates the file is a certificate), and carry out the registration without the certificate holder's involvement.

In case of successful verification of the owner, the ISP 820 signs the public key certificate of the website and sends the signed certificate to the information retrieval tool 810 for further analysis. Thus, using the information from the Internet service provider 820, it is possible to gain extra certainty as to the authenticity of the submitted data. In authenticating a certificate being presented by a client of the ISP, the ISP may be queried to request the company ID associated with the certificate holder by providing the serial number of the certificate. In response, the ISP can return a copy of the certificate and the name of the company that is associated with it, as known by the ISP. The choice of which ISP to poll may depend on the circumstances. For example, one or more top-level ISPs can be polled; likewise, one or more specific ISPs deemed to be the most likely to be providing service to certain parties, may be preferentially polled. If the most likely ISP (or set thereof) is queried, and the information about the presented certificate has not been returned, this may be grounds for deeming the certificate untrustworthy.

In preferred embodiments, the public key certificate from the ISP 820 is signed by multiple certification centers, which significantly reduces the probability of the use of a fake certificate for the ISP 820. It should be noted that, in individual embodiments, the information retrieval tool 810 saves the information on the Internet service provider for the holder of the certificate, which is subsequently used to identify suspicious certificates.

Also, in some embodiments of the invention, the ISP 820 submits information on whether he knows the certificate or not, and, if yes, who holds it. Hence, the information retrieval tool 810 sends a request for further information on the certificate. The ISP checks his internal databases and returns a reply in the form "known, company a", or "unknown". Therefore, if the certificate is not known to any provider, it can be considered to be used by an offender, as an offender does not want to identify himself to the Internet service provider.

The benefits of this approach consist in the fact that the Internet service provider is the first to receive the certificate after the certification center, and in the fact that the ISP is able to identify their clients.

Figure 8:
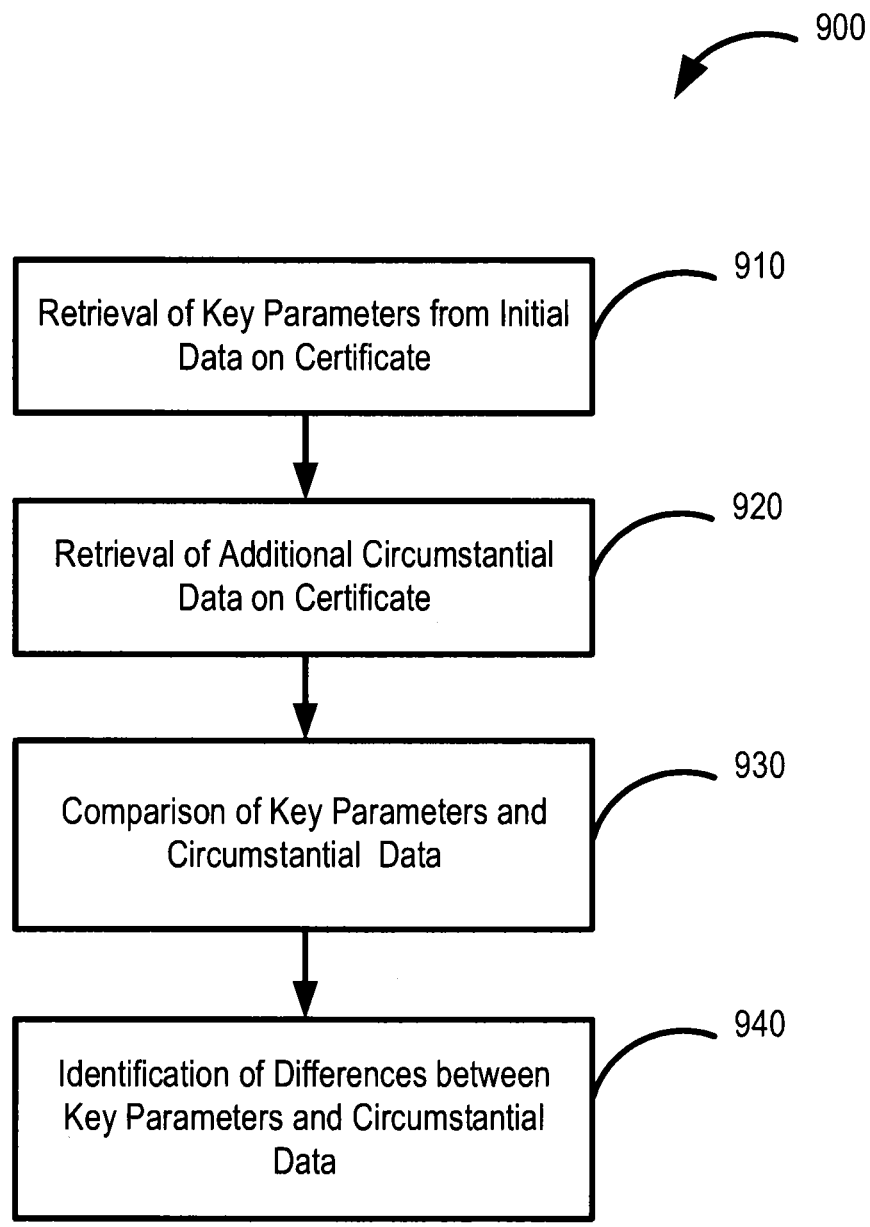
FIG. 8 is a flow diagram illustrating a two-staged process of detecting suspicious certificates based on a comparison between initially-collected data pertaining to certificates, and further-researched circumstantial data relating to actual usage of the certificates according to one embodiment.

FIG. 8 is a flow diagram illustrating a two-staged process of detecting suspicious certificates based on a comparison between initially-collected data pertaining to certificates, and further-researched circumstantial data relating to actual usage of the certificates according to one embodiment. At 910, the process selects the key parameters from the initial data on the certificate in question. Operation 910 can be performed using known methods of parsing and otherwise working with certificates. Then, at 920, additional circumstantial data on the pertaining to the certificate's key parameters is received from information sources. For example, it is possible to obtain the certificate holder's name with the Internet service provider, utilize search engines to verify the URL address where the certificate is located, and compare the new certificate's serial number with the certificates actually used when accessing the URL address specified in the certificate.

Next, at 930, the received data are compared, after which operation 940 finds differences between the certificate's key parameters and the additional circumstantial data. If a discrepancy is found for at least one key parameter, a determination is made at 940 to consider the certificate suspicious.

FIG. 9 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, power line, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the NNorthbridge or SSouthbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computer network, a method for analyzing authenticity digital certificates, the method comprising:
    obtaining, from a plurality of diverse information sources within the computer network, initial information pertaining to digital certificates, wherein for each of the digital certificates the initial information includes:
        intrinsic parameter data from among contents of the digital certificate;
        extrinsic parameter data pertaining to the digital certificate and comprising static data not contained in the contents of the digital certificate;
    storing, in a data store, selected parameter data from among the intrinsic parameter data and the extrinsic parameter data;
    analyzing the selected parameter data to determine a measure of suspiciousness for each of the digital certificates;
    based on the measure of suspiciousness, determining a need for collection of supplemental data for further analysis of any of the digital certificates;
    in response to the determination of need for supplemental data for any of the digital certificates, collecting circumstantial data pertaining to that digital certificate, the circumstantial data being based on actual usage of that digital certificate;
    comparing the initial data and supplemental data against a set of decision criteria, the set of decision criteria defining parameters and combinations of parameters associated with fraudulent activity; and
    based on the comparing, providing a determination of authenticity of each of the digital certificates.

2. The method claim 1, wherein the initial information includes extrinsic parameter data selected from the group consisting of: a URL of the information source from which the certificate was obtained, a location of one or more of the information sources from which the initial information was obtained, a location of the Internet service provider of an owner of each digital certificate, a network-determined location of a presenter of each digital certificate, information on when one or more of the information sources first encountered the certificate, or any combination thereof.

3. The method claim 1, wherein the information sources include at least one information source selected from the group consisting of a certificate authority, a purported digital certificate owner, a party to whom digital certificates are presented, a search engine, or any combination thereof.

4. The method claim 1, wherein the information sources include an Internet service provider ISP and wherein the extrinsic parameter data includes information based on ISP account holder information.

5. The method claim 1, wherein obtaining the initial information includes polling at least one of the information sources.

6. The method claim 1, wherein obtaining the initial information is initiated by at least one of the information sources.

7. The method claim 1, wherein the storing includes grouping the initial information by at least one predetermined parameter selected from the group consisting of: company name indicated in the digital certificates, uniform resource locator, geographic region of a purported owner of each digital certificate, or any combination thereof.

8. The method claim 1, wherein the analyzing of the selected parameter data to determine the measure of suspiciousness includes comparing portions of the intrinsic parameter data for each certificate against the extrinsic parameter data for the same certificate.

9. The method claim 1, wherein the analyzing of the selected parameter data to determine the measure of suspiciousness includes comparing portions of the initial data relating to a first digital certificate against a plurality of corresponding parameters of a plurality of other digital certificates.

10. The method claim 1, wherein the analyzing of the selected parameter data to determine the measure of suspiciousness includes comparing portions of the initial data relating to a first digital certificate against a grouping based on certain parameters of a plurality of other digital certificates.

11. The method claim 1, wherein the analyzing of the selected parameter data to determine the measure of suspiciousness includes comparing different parameters of the initial data relating to geographic location associated with a first digital certificate.

12. The method claim 1, wherein the analyzing of the selected parameter data to determine the measure of suspiciousness includes comparing parameters of the initial data relating to validity period associated with a first digital certificate against temporal data associated with one or more other digital certificates.

13. The method claim 1, wherein the circumstantial data includes temporal information representing how long the digital certificate has been used.

14. The method claim 1, wherein the circumstantial data includes geographic region information on actual usage of the digital certificate.

15. The method claim 1, wherein the circumstantial data includes rates of usage of the digital certificate over time.

16. A system for analyzing authenticity digital certificates comprising:
   a computer system including computing hardware and a plurality of operatively coupled modules comprising instructions executable on the computing hardware, the modules including:
   an initial data collection module configured to obtain, from a plurality of diverse information sources communicatively coupled to the computer system, initial information pertaining to digital certificates, wherein for each of the digital certificates the initial information includes:
      intrinsic parameter data from among contents of the digital certificate; and
      extrinsic parameter data pertaining to the digital certificate and comprising static data not contained in the contents of the digital certificate;
   a database configured to store selected parameter data from among the intrinsic parameter data and the extrinsic parameter data;
   an abnormality detection module configured to analyze the selected parameter data to determine a measure of suspiciousness for each of the digital certificates, and, based on the measure of suspiciousness, determine a need for collection of supplemental data for further analysis of any of the digital certificates;
   a communication module configured to collect circumstantial data in response to a determination by the abnormality detection module of a need for supplemental data for any of the digital certificates, the circumstantial data pertaining to that digital certificate, and based on actual usage of that digital certificate;
   a suspicious certificate detection module configured to compare the initial data and supplemental data against a set of decision criteria, the set of decision criteria defining parameters and combinations of parameters associated with fraudulent activity; and
   a decision module configured to provide a determination of authenticity of each of the digital certificates based on an output the suspicious certificate detection module.

17. The system claim 16, wherein the initial information includes extrinsic parameter data selected from the group consisting of: a URL of the information source from which the certificate was obtained, a location of one or more of the information sources from which the initial information was obtained, a location of the Internet service provider of an owner of each digital certificate, a network-determined location of a presenter of each digital certificate, information on when one or more of the information sources first encountered the certificate, or any combination thereof.

18. The system claim 16, wherein the information sources include at least one information source selected from the group consisting of a certificate authority, a purported digital certificate owner, a party to whom digital certificates are presented, a search engine, or any combination thereof.

19. The system claim 16, wherein the information sources include an Internet service provider ISP and wherein the extrinsic parameter data includes information based on ISP account holder information.

20. The system claim 16, wherein the database stores the initial information grouped by at least one predetermined parameter.

21. The system claim 16, wherein the database stores the initial information grouped by at least one predetermined parameter selected from the group consisting of: company name indicated in the digital certificates, uniform resource locator, geographic region of a purported owner of each digital certificate, or any combination thereof.

22. The system claim 16, wherein the database stores the initial information grouped by similar company name.

23. The system claim 16, wherein the abnormality detection module is configured to determine the measure of suspiciousness by comparing portions of the intrinsic parameter data for each certificate against the extrinsic parameter data for the same certificate.

24. The system claim 16, wherein the abnormality detection module is configured to determine the measure of suspiciousness by comparing portions of the initial data relating to a first digital certificate against a plurality of corresponding parameters of a plurality of other digital certificates.

25. The system claim 16, wherein the abnormality detection module is configured to determine the measure of suspiciousness by comparing portions of the initial data relating to a first digital certificate against a grouping based on certain parameters of a plurality of other digital certificates.

26. The system claim 16, wherein the abnormality detection module is configured to determine the measure of suspiciousness by comparing different parameters of the initial data relating to geographic location associated with a first digital certificate.

27. The system claim 16, wherein the abnormality detection module is configured to determine the measure of suspiciousness by comparing parameters of the initial data relating to validity period associated with a first digital certificate against temporal data associated with one or more other digital certificates.

28. The system claim 16, wherein the circumstantial data includes temporal information representing how long the digital certificate has been used.

29. The system claim 16, wherein the circumstantial data includes geographic region information on actual usage of the digital certificate.

30. The system claim 16, wherein the circumstantial data includes rates of usage of the digital certificate over time.

* * * * *